(12) United States Patent
Bostick, III et al.

(10) Patent No.: US 7,219,729 B2
(45) Date of Patent: May 22, 2007

(54) PERMANENT DOWNHOLE DEPLOYMENT OF OPTICAL SENSORS

(75) Inventors: F. X. Bostick, III, Houston, TX (US); David G. Hosie, Sugar Land, TX (US); Michael Brian Grayson, Sugar Land, TX (US); R. K. Bansal, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 247 days.

(21) Appl. No.: 10/676,376

(22) Filed: Oct. 1, 2003

(65) Prior Publication Data

US 2004/0112595 A1 Jun. 17, 2004

Related U.S. Application Data

(63) Continuation-in-part of application No. 10/288,229, filed on Nov. 5, 2002.

(51) Int. Cl.
  *E21B 47/12* (2006.01)
(52) U.S. Cl. ............... 166/250.01; 166/66; 166/242.1; 250/256
(58) Field of Classification Search ........... 166/250.01, 166/65.1, 242.1, 66; 73/152.46, 152.36, 73/152.45; 250/256
  See application file for complete search history.

(56) References Cited

U.S. PATENT DOCUMENTS

| 3,831,138 | A |   | 8/1974 | Rammer |
| 3,876,972 | A | * | 4/1975 | Garrett ........................ 367/82 |
| 3,986,350 | A |   | 10/1976 | Schmidt |
| 4,015,234 | A |   | 3/1977 | Krebs |
| 4,160,970 | A |   | 7/1979 | Nicolson |
| 4,691,203 | A |   | 9/1987 | Rubin et al. |
| 4,775,009 | A |   | 10/1988 | Wittrisch et al. |
| 5,235,285 | A |   | 8/1993 | Clark et al. |
| 5,303,773 | A |   | 4/1994 | Czernichow et al. |
| 5,355,952 | A |   | 10/1994 | Meynier |
| 5,512,889 | A |   | 4/1996 | Fletcher |
| 5,517,024 | A | * | 5/1996 | Mullins et al. ............. 250/254 |

(Continued)

FOREIGN PATENT DOCUMENTS

CA  2288784  11/1998

(Continued)

OTHER PUBLICATIONS

Downhole Deployment Valve Bulletin, Weatherford International Ltd., (online) Jan. 2003. Available from http://www.weatherford.com/weatherford/groups/public/documents/general/wft004406.pdf.

(Continued)

*Primary Examiner*—Kenneth Thompson
(74) *Attorney, Agent, or Firm*—Patterson & Sheridan, LLP.

(57) ABSTRACT

The present invention involves methods and apparatus for permanent downhole deployment of optical sensors. Specifically, optical sensors may be permanently deployed within a wellbore using a casing string. In one aspect, one or more optical sensors are disposed on, in, or within the casing string. The optical sensors may be attached to an outer surface of the casing string or to an inner surface of the casing string, as well as embedded within a wall of the casing string. The optical sensors are capable of measuring wellbore parameters during wellbore operations, including completion, production, and intervention operations.

24 Claims, 5 Drawing Sheets

U.S. PATENT DOCUMENTS

| | | | |
|---|---|---|---|
| 5,767,411 A * | 6/1998 | Maron ..................... 73/705 |
| 5,892,860 A | 4/1999 | Maron et al. |
| 6,018,501 A | 1/2000 | Smith et al. |
| 6,072,567 A | 6/2000 | Sapack |
| 6,209,663 B1 | 4/2001 | Hosie |
| 6,268,911 B1 * | 7/2001 | Tubel et al. ................ 356/72 |
| 6,271,766 B1 * | 8/2001 | Didden et al. ........... 340/853.1 |
| 6,308,137 B1 | 10/2001 | Underhill et al. |
| 6,354,147 B1 | 3/2002 | Gysling et al. |
| 6,422,084 B1 | 7/2002 | Fernald et al. |
| 6,425,444 B1 | 7/2002 | Metcalfe et al. |
| 6,427,776 B1 | 8/2002 | Hoffman et al. |
| 6,429,784 B1 | 8/2002 | Beique |
| 6,437,326 B1 * | 8/2002 | Yamate et al. ........... 250/269.1 |
| 6,558,036 B2 * | 5/2003 | Gysling et al. ............. 374/147 |
| 6,590,647 B2 * | 7/2003 | Stephenson ................ 356/301 |
| 6,693,554 B2 | 2/2004 | Beique |
| 6,747,570 B2 | 6/2004 | Beique |
| 6,751,556 B2 * | 6/2004 | Schroeder et al. ............. 702/6 |
| 6,840,114 B2 | 1/2005 | Niezgorski |
| 6,847,034 B2 * | 1/2005 | Shah et al. ............. 250/269.1 |
| 6,915,686 B2 * | 7/2005 | Baustad ................... 73/152.46 |
| 6,928,202 B2 * | 8/2005 | Pickrell et al. ................ 385/12 |
| 6,957,574 B2 * | 10/2005 | Ogle ....................... 73/152.48 |
| 6,978,833 B2 * | 12/2005 | Salamitou et al. ........ 166/255.1 |
| 6,987,463 B2 | 1/2006 | Beique |
| 7,040,402 B2 * | 5/2006 | Vercaemer ............... 166/253.1 |
| 7,046,165 B2 | 5/2006 | Beique |
| 2004/0139791 A1 | 7/2004 | Johansen |

FOREIGN PATENT DOCUMENTS

| | | |
|---|---|---|
| CA | 2325917 | 5/2001 |
| EP | 0 945 590 A2 | 9/1999 |
| GB | 2 299 915 A | 10/1996 |
| GB | 2 330 598 A | 4/1999 |
| GB | 2 335 453 A | 9/1999 |
| GB | 2 360 532 A | 8/2000 |

OTHER PUBLICATIONS

Nimir Field In Oman Proves The Downhole Deployment Valve A Vital Technological Key To Success, Weatherford International Ltd., (online) 2003. Available at http://www.weatherford.com/weatherford/groups/public/documents/general/wft004337.pdf.

CA Office Action, Application No. 2,482,487, Dated Aug. 14, 2006.

* cited by examiner

PERMANENT DOWNHOLE DEPLOYMENT OF OPTICAL SENSORS

CROSS-REFERENCE TO RELATED APPLICATIONS

This application is a continuation-in-part of co-pending U.S. patent application Ser. No. 10/288,229, filed Nov. 5, 2002, which is herein incorporated by reference in its entirety.

This application is related to co-pending U.S. patent application Ser. No. 10/677,135, filed on the same day as the current application, entitled "Instrumentation for a Downhole Deployment Valve", which is herein incorporated by reference in its entirety.

BACKGROUND OF THE INVENTION

1. Field of the Invention

The present invention generally relates to methods and apparatus for use in oil and gas wellbores. More particularly, the invention relates to using instrumentation to monitor downhole conditions within wellbores.

2. Description of the Related Art

In well completion operations, a wellbore is formed to access hydrocarbon-bearing formations by the use of drilling. Drilling is accomplished by utilizing a drill bit that is mounted on the end of a drill support member, commonly known as a drill string. To drill within the wellbore to a predetermined depth, the drill string is often rotated by a top drive or rotary table on a surface platform or rig, or by a downhole motor mounted towards the lower end of the drill string. After drilling to a predetermined depth, the drill string and drill bit are removed and a section of casing is lowered into the wellbore. An annular area is thus formed between the string of casing and the formation. The casing string is temporarily hung from the surface of the well. A cementing operation may optionally be conducted in order to fill the annular area with cement and set the casing string within the wellbore. Using apparatus known in the art, the casing string may be cemented into the wellbore by circulating cement into the annular area defined between the outer wall of the casing and the borehole. The amount and extent of cement in the annular area may vary from a small amount of cement only at the lower portion of the annulus to a large amount of cement extending to the surface or the top of the casing string. The combination of cement and casing strengthens the wellbore and facilitates the isolation of certain areas of the formation behind the casing for the production of hydrocarbons.

It is common to employ more than one string of casing in a wellbore. In this respect, the well is drilled to a first designated depth with a drill bit on a drill string. The drill string is removed. A first string of casing or conductor pipe is then run into the wellbore and set in the drilled out portion of the wellbore, and cement may be circulated into the annulus behind the casing string. Next, the well is drilled to a second designated depth, and a second string of casing, or liner, is run into the drilled out portion of the wellbore. The second string is set at a depth such that the upper portion of the second string of casing overlaps the lower portion of the first string of casing. The second liner string is then fixed, or "hung" off of the existing casing by the use of slips which utilize slip members and cones to wedgingly fix the new string of liner in the wellbore. The second casing string may then be cemented. This process is typically repeated with additional casing strings until the well has been drilled to total depth. As more casing strings are set in the wellbore, the casing strings become progressively smaller in diameter in order to fit within the previous casing string. In this manner, wells are typically formed with two or more strings of casing of an ever-decreasing diameter.

As an alternative to the conventional method, drilling with casing is a method increasingly used to place casing strings of decreasing diameter within the wellbore. This method involves attaching a cutting structure in the form of a drill bit to the same string of casing which will line the wellbore. Rather than running a drill bit on a smaller diameter drill string, the drill bit or drill shoe is run in at the end of the larger diameter of casing that will remain in the wellbore and may be cemented therein. Drilling with casing is often the preferred method of well completion because only one run-in of the working string into the wellbore is necessary to form and line the wellbore.

While drilling the drill string or the casing string into the formation, drilling fluid is ordinarily circulated through the inner diameter of the casing string or drill string, out through the casing string or drill string, and up around the outer diameter of the casing string or drill string. Typically, passages are formed through the drill bit to allow circulation of the drill fluid. Fluid circulation prevents collapse of the formation around the drill string or casing string, forces the cuttings produced by the drill bit drilling through the formation out from the wellbore and up to the surface rather than allowing the cuttings to enter the inner diameter of the drill string or casing string, and facilitates the drilling process by forming a path through the formation for the drill bit.

Recent developments have allowed sensing of parameters within the wellbore and within the formation during the life of a producing well. Typically, the drill string or casing string with the drill bit attached thereto is drilled into the formation to a depth. When drilling with the drill string, the drill string is removed, a casing string is placed within the drilled-out wellbore, and the casing string may be cemented into the wellbore. When drilling with casing, the casing string may be cemented into place once it has drilled to the desired depth within the formation. Production tubing is then inserted into the casing string, and perforations are placed through the production tubing, casing string, cement around the casing string, and the formation at the desired depth for production of hydrocarbons. The production tubing may have sensors therearound for sensing wellbore and formation parameters while drilling and during production operations.

Historically, monitoring systems have used electronic components to provide pressure, temperature, flow rate and water fraction on a real-time basis. These monitoring systems employ temperature gauges, pressure gauges, acoustic sensors, seismic sensors, electromagnetic sensors, and other instruments or "sondes", including those which provide nuclear measurements, disposed within the wellbore. Such instruments are either battery operated, or are powered by electrical cables deployed from the surface. The monitoring systems have historically been configured to provide an electrical line that allows the measuring instruments, or sensors, to send measurements to the surface.

Recently, optical sensors have been developed which communicate readings from the wellbore to optical signal processing equipment located at the surface. Optical sensors may be disposed along the production tubing within a wellbore. An optical line or cable is run from the surface to the optical sensor downhole. The optical sensor may be a pressure gauge, temperature gauge, acoustic sensor, seismic sensor, or other sonde. The optical line transmits optical signals to the optical signal processor at the surface.

The optical signal processing equipment includes an excitation light source. Excitation light may be provided by a broadband light source, such as a light emitting diode (LED) located within the optical signal processing equipment. The optical signal processing equipment also includes appropriate equipment for delivery of signal light to the sensor(s), e.g., Bragg gratings or lasers and couplers which split the signal light into more than one leg for delivery to more than one sensor. Additionally, the optical signal processing equipment includes appropriate optical signal analysis equipment for analyzing the return signals from the Bragg gratings.

The optical line is typically designed so as to deliver pulses or continuous signals of optic energy from the light source to the optical sensor(s). The optical cable is also often designed to withstand the high temperatures and pressures prevailing within a hydrocarbon wellbore. Preferably, the optical cable includes an internal optical fiber which is protected from mechanical and environmental damage by a surrounding capillary tube. The capillary tube is made of a high strength, rigid-walled, corrosion-resistant material, such as stainless steel. The tube is attached to the sensor by appropriate means, such as threads, a weld, or other suitable method. The optical fiber contains a light guiding core which guides light along the fiber. The core preferably employs one or more Bragg gratings to act as a resonant cavity and to also interact with the sonde.

While optical sensors placed on production tubing allow measurements while the production tubing is located within the wellbore, the sensors on production tubing do not allow monitoring of wellbore and formation conditions during the drilling and well completion operations and after the production tubing is removed from the wellbore. Thus, the sensors are only deployed temporarily while the production tubing is within the wellbore. Furthermore, when employing seismic sensors which need to be coupled to the formation, sensors located on production tubing are located at a distance from the formation, so that measurements of formation parameters derive some inaccuracy due to signal attenuation of the sensor without coupling the sensor to the formation. Coupling the sensors to the formation requires complicated maneuvers and equipment across the distance between the production tubing and the formation.

Accordingly, there is a need for apparatus and methods for permanently deploying measurement devices. There is a need for apparatus and methods for measuring wellbore and formation conditions throughout drilling and well completion operations, well production operations, and the remaining operations of a well. Furthermore, there is a need for apparatus and methods for locating measurement devices closer to the formation than is currently possible to increase the accuracy of the measured parameters and to facilitate coupling of the optical sensors to the formation.

SUMMARY OF THE INVENTION

In one aspect, the present invention involves an apparatus for permanently measuring wellbore or formation parameters, comprising a casing string permanently located within a wellbore, and at least one optical sensor attached to the casing string, the at least one optical sensor capable of measuring one or more wellbore or formation parameters. In another aspect, the present invention provides an apparatus for permanently measuring wellbore or formation parameters, comprising a casing string permanently located within a wellbore, and at least one optical sensor located at least partially within a wall of the casing string, the at least one optical sensor capable of measuring one or more wellbore or formation parameters.

In yet another aspect, the present invention provides a method of permanently monitoring wellbore or formation parameters, comprising providing a casing string having at least one optical sensor attached thereto, locating the casing string within a wellbore, and measuring one or more wellbore or formation parameters with the at least one optical sensor.

In another aspect, the present invention includes an apparatus for measuring fluid flow through a casing string, comprising a casing string permanently located within a wellbore, one or more optical sensors attached to the casing string for measuring parameters of a fluid flowing through the casing string, and control circuitry and signal processing adapted to determine a composition of the fluid or flow rate of the fluid based on one or more signals received from the one or more optical sensors. In yet another aspect, the present invention includes a method for determining a flow rate or one or more volumetric fractions of individual phases of a fluid flowing through a casing string, comprising locating a casing string having one or more optical sensors attached thereto within a wellbore, measuring one or more parameters of the fluid flowing through the casing string with the one or more optical sensors, and using the one or more parameters to determine the flow rate of the fluid or one or more volumetric fractions of the fluid.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In contrast to the current practice of deploying sensors during production operations with production tubing, the present invention provides apparatus and methods for permanently deploying optical sensors for use in measuring wellbore parameters during all wellbore operations, including but not limited to completion operations, drilling operations, and intervention operations. The present invention also beneficially provides methods and apparatus for placing optical sensors within the wellbore earlier in the wellbore operations, specifically during drilling and completion of the well, which occur prior to production operations. Additionally, the present invention includes apparatus and methods for locating seismic sensors closer to the formation than is possible with the current use of production tubing for the deployment of optical sensors, by use of one or more optical sensors deployed with a casing string. Although pressure and temperature sensing does not require coupling of the optical sensor to the formation, a seismic sensor (e.g. an accelerometer or geophone) must be coupled to the formation by either cementing the seismic sensor into place or by placing the sensor into significant contact with the formation. The present invention facilitates coupling of seismic optical sensors to the formation, thereby increasing accuracy of the seismic readings.

As used herein, an "optical sensor" may comprise any suitable type of optical sensing elements, such as those described in U.S. Pat. No. 6,422,084, entitled "Bragg Grating Pressure Sensor", which is herein incorporated by reference in its entirety. For example, the optical sensor may comprise an optical fiber, having the reflective element embedded therein; and a tube, having the optical fiber and the reflective element encased therein along a longitudinal axis of the tube, the tube being fused to at least a portion of the fiber. Alternatively, the optical sensor may comprise a large diameter optical waveguide having an outer cladding and an inner core disposed therein.

Optical Sensor Deployment

Figure 1:
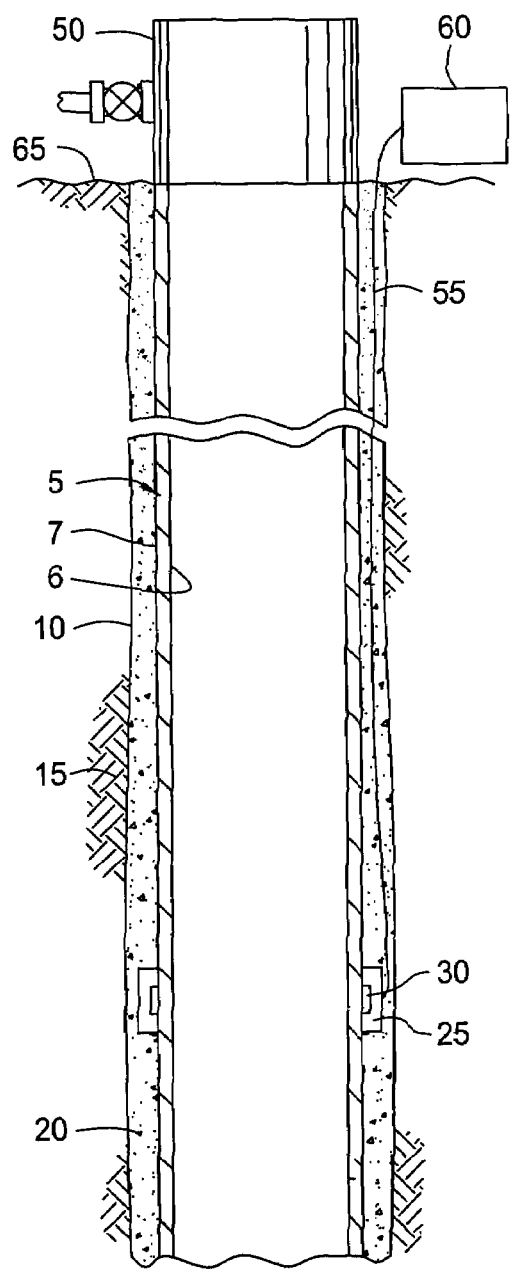
FIG. 1 is a cross-sectional view of a casing string within a wellbore. An optical sensor is permanently deployed on an outer surface of the casing string through attachment of a sensor protector to the outer surface of the casing string, the optical sensor being housed within the sensor protector.
Figure 2:
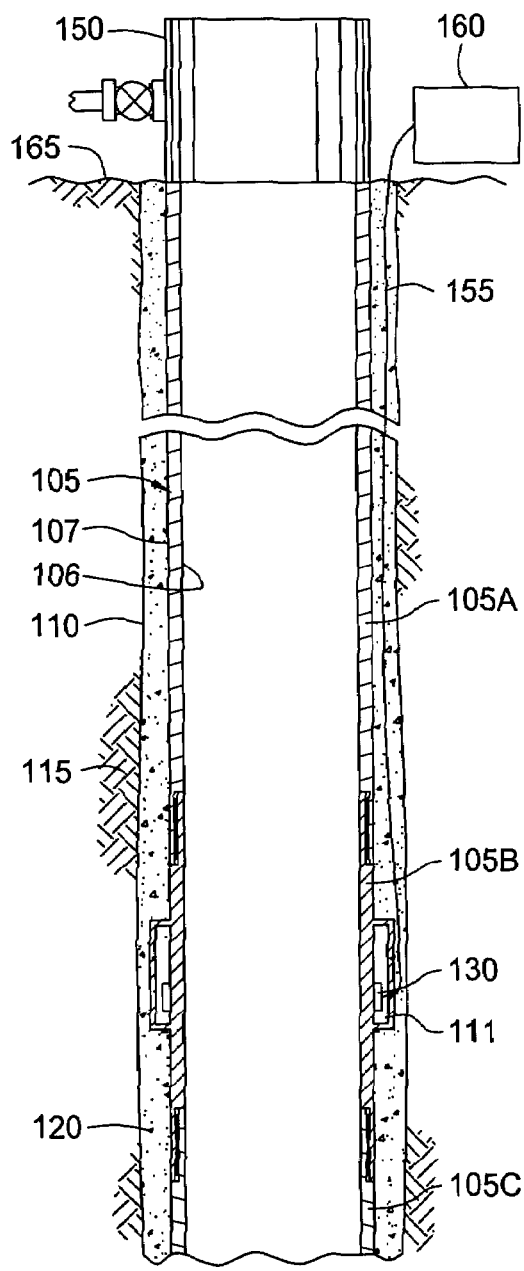
FIG. 2 is a cross-sectional view of a casing string within a wellbore. An optical sensor is housed within a protective pocket on a mandrel. The mandrel is located in the casing string.
Figure 3:
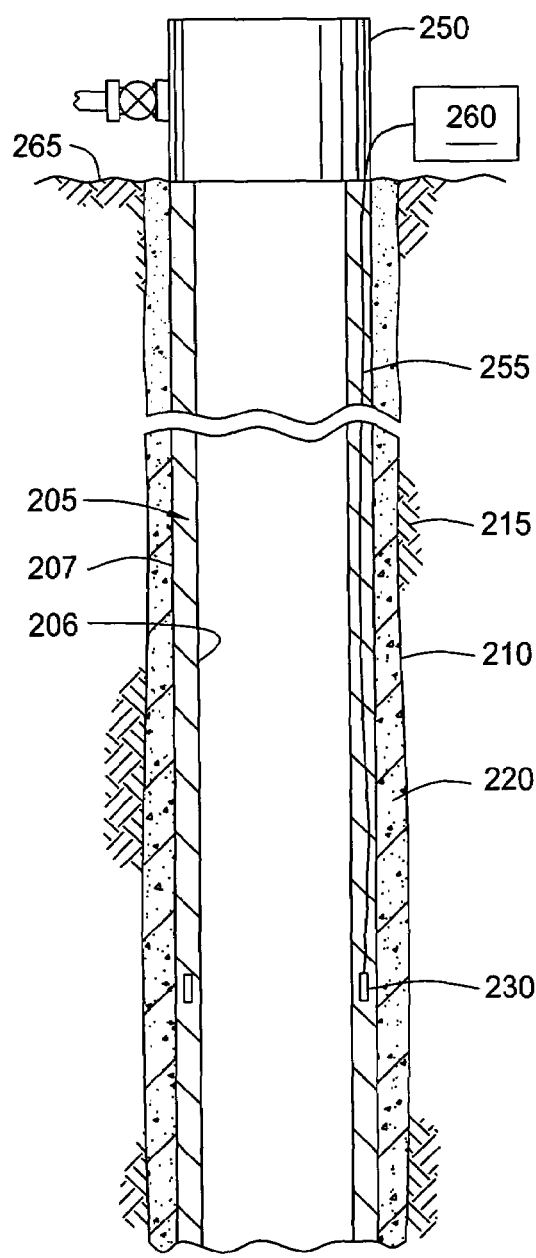
FIG. 3 is a cross-sectional view of a casing string within a wellbore. An optical sensor is embedded within a wall of the casing string.
Figure 4:
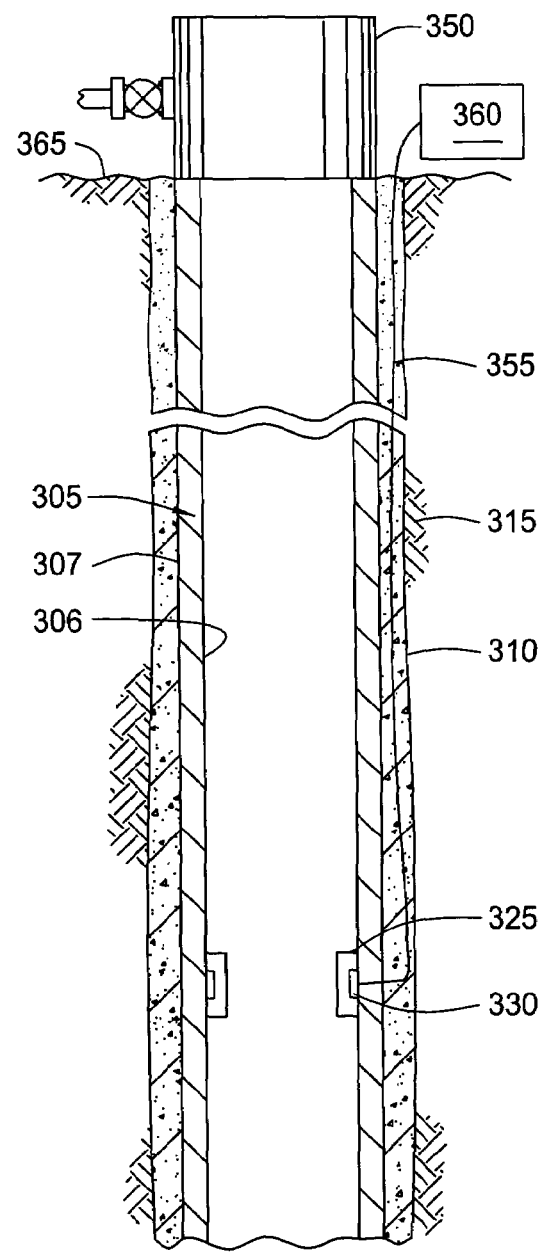
FIG. 4 is a cross-sectional view of a casing string within a wellbore. An optical sensor is permanently deployed with the casing string through the attachment of a sensor protector to an inner surface of the casing string, the optical sensor housed within the sensor protector.
Figure 5:
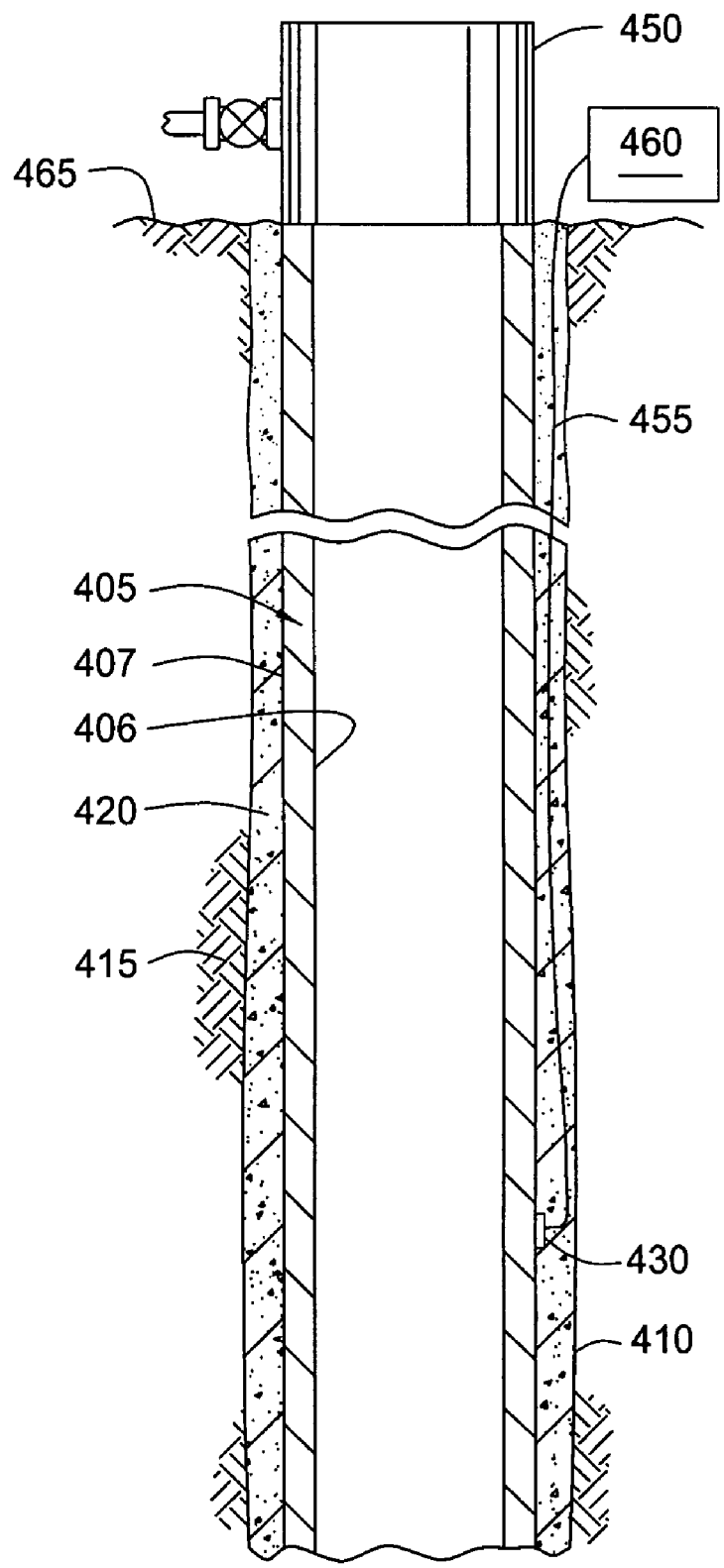
FIG. 5 is a cross-sectional view of a casing string within a wellbore. An optical sensor is attached directly to the outer surface of the casing string.
Figure 6:
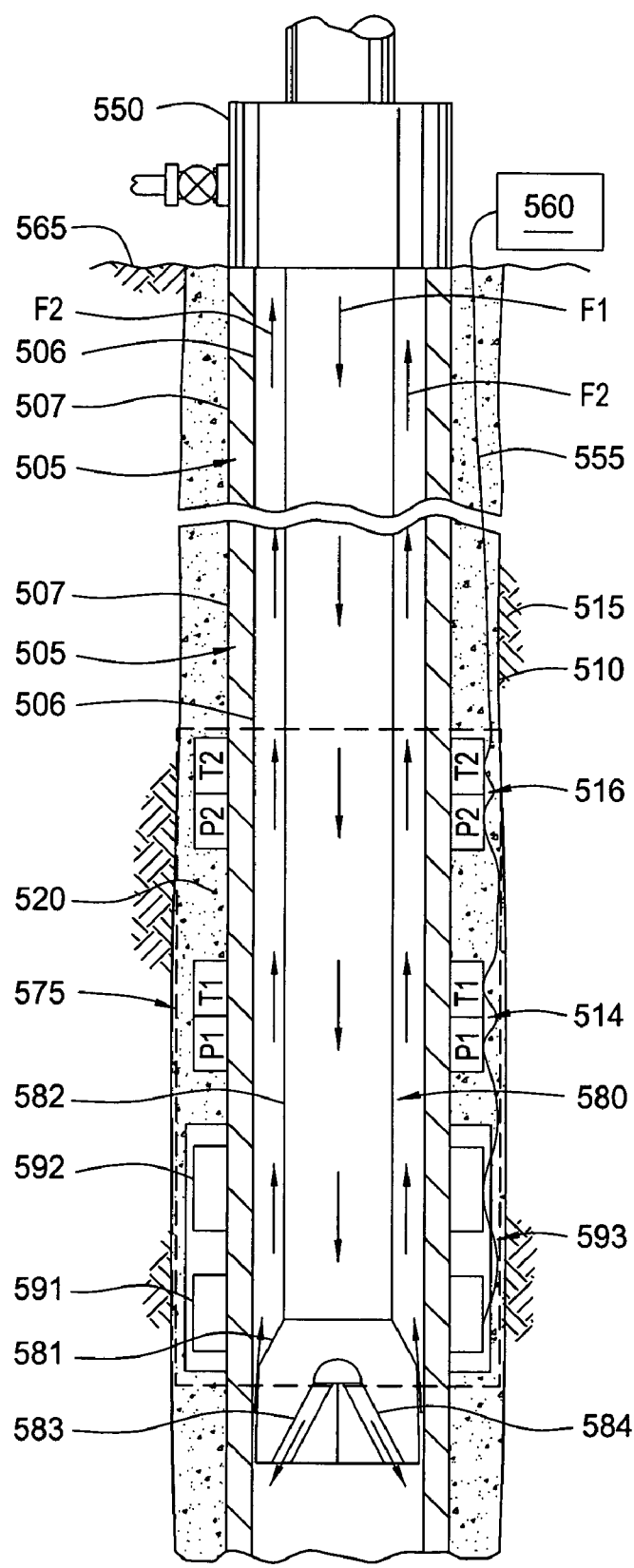
FIG. 6 is a cross-sectional view of a flow meter disposed in a casing string, the casing string located within a wellbore. The flow meter is permanently deployed within the wellbore on the casing string.
Figure 7:
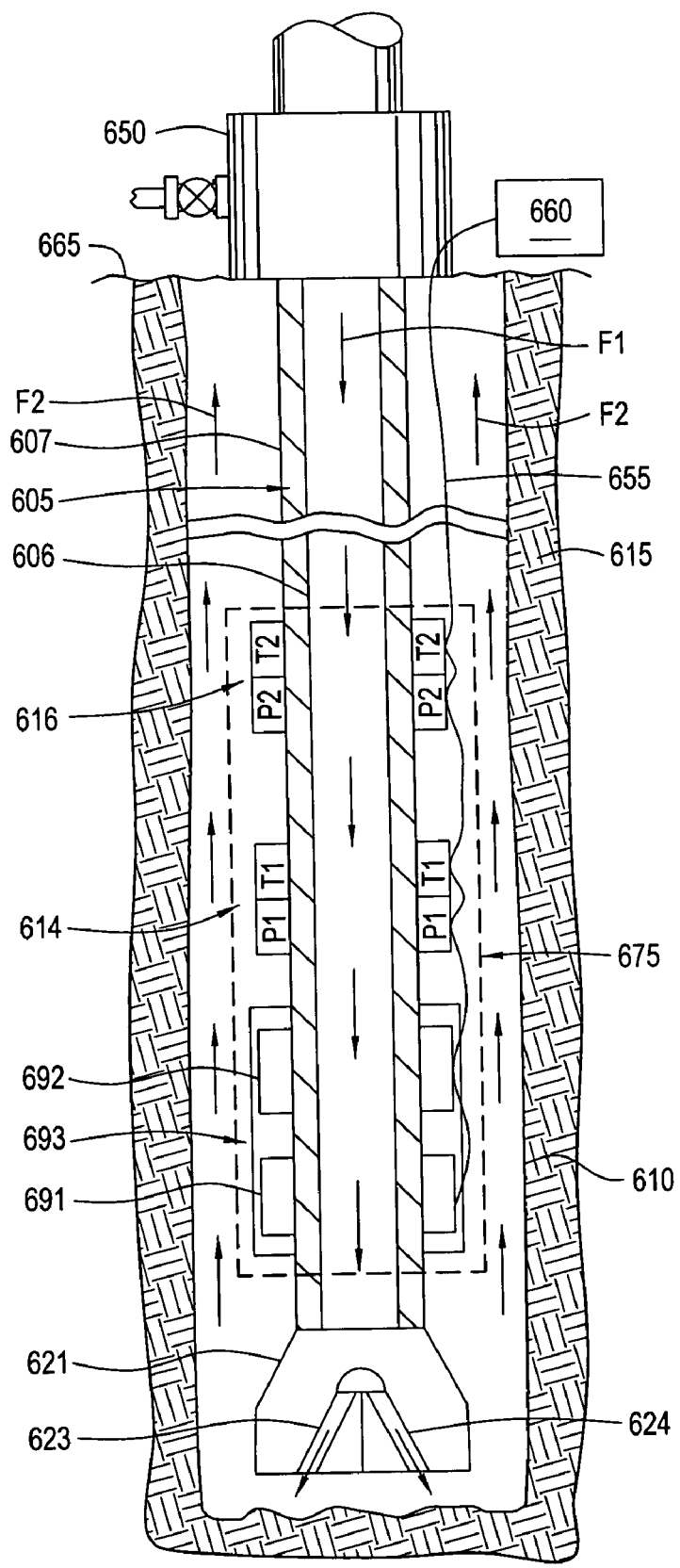
FIG. 7 is a cross-sectional view of a flow meter disposed within a casing string, the casing string having an earth removal member operatively attached to its lower end. The casing string is shown drilling into the formation.

FIGS. 1–7 show the various ways in which one or more optical sensors may be permanently deployed on casing. One or more optical sensors may be deployed on the outside of the casing, as shown in FIGS. 1–2 and 5, or deployed on the inside of the casing, as shown in FIG. 4. Alternatively, one or more optical sensors may be embedded within the casing, as shown in FIG. 3. One or more optical sensors may also be part of a flow meter disposed in a casing string, as shown in FIGS. 6–7.

Exemplary Deployment Apparatus and Techniques

FIG. 1 shows an embodiment of the present invention. A casing string 5 is shown within a wellbore 10 formed within a formation 15. The casing string 5, which comprises one or more casing sections threadedly connected to one another, has an inner surface 6 and an outer surface 7. A physically alterable bonding material 20, preferably cement, may be utilized to permanently set the casing string 5 within the wellbore 10.

A sensor carrier 25 is attached to the outer surface 7 of the casing string 5 and disposed circumferentially around the casing string 5. Within the sensor carrier 25 is an optical sensor 30, which is used to sense conditions such as temperature, pressure, acoustics, and/or seismic conditions, within the wellbore 10 and the formation 15. The sensor carrier 25 attaches the optical sensor 30 to the outer surface 7 of the casing string 5, as well as protects the optical sensor 30 from the often harsh environment within the wellbore 10.

Optical sensors offer one alternative to conventional electronic sensors. Typically, optical sensors have no downhole electronics or moving parts and, therefore, may be exposed to harsh downhole operating conditions without the typical loss of performance exhibited by electronic sensors. The optical sensor 30 may utilize strain-sensitive Bragg gratings (not shown) formed in a core of one or more optical fibers (not shown) included in an optical cable 55. The optical cable 55 is connected at one end to the optical sensor 30 and runs through the sensor carrier 25, alongside the outer surface 7 of the casing string 5, and to a surface 65 of the wellbore 10. Bragg grating-based sensors are suitable for use in very hostile and remote environments, such as found downhole in wellbores.

Depending on a specific arrangement, multiple optical sensors 30 may be employed, attached to the outer surface 7 by multiple sensor carriers 25, so that the optical sensors 30 may be distributed on a common one of the fibers or distributed among multiple fibers. Additionally, the fibers may be encased in protective coatings, and may be deployed in fiber delivery equipment, as is well known in the art.

The one or more sensor carrier(s) 25 may be attached to the outer surface 7 by any method known by those skilled in the art in which the one or more sensor carrier(s) 25 provides adequate protection to the one or more optical sensor(s) 30 and effectively attaches the one or more optical sensor(s) to the outer surface 7. In one embodiment, the sensor carrier 25 is welded to the outer surface 7. In another embodiment, the sensor carrier 25 is clamped firmly to the outer surface 7 of the casing string 5 and may be cemented into place.

Disposed at a surface 65 of the wellbore 10 is a wellhead 50 through which the casing string 5 and other tools and components used during wellbore operations are lowered into the wellbore 10. Also located at the surface 65 is a signal interface 60. The optical cable 55 is connected to the signal interface 60 at the opposite end from its connection to the optical sensor 30.

The signal interface 60 may include a broadband light source, such as a light emitting diode (LED), and appropriate equipment for delivery of signal light to the Bragg gratings formed within the core of the optical fibers. The signal interface 60 may further include logic circuitry, which encompasses any suitable circuitry and processing equipment necessary to perform operations described herein, including appropriate optical signal processing equipment for receiving and/or analyzing the return signals (reflected light) from the one or more optical sensors 30 transmitted via the one or more optical cables 55. For example, the logic circuitry may include any combination of dedicated processors, dedicated computers, embedded controllers, general purpose computers, programmable logic controllers, and the like. Accordingly, the logic circuitry may be configured to perform operations described herein by standard programming means (e.g., executable software and/or firmware).

Below the optical sensor 30, the fibers may be connected to other sensors (not shown) disposed along the casing string 5, terminated, or connected back to the signal interface 60. While not shown, the one or more cables 55 may also include any suitable combination of peripheral elements (e.g., optical cable connectors, splitters, etc.) well known in the art for coupling the fibers.

The one or more optical sensors 30 may include pressure, temperature, acoustic, seismic, velocity, or speed of sound sensors, or any other suitable sensors for measuring the desired parameters within the wellbore 10 or the formation 15. The pressure and temperature (P/T) sensors may be similar to those described in detail in commonly-owned U.S. Pat. No. 5,892,860, entitled "Multi-Parameter Fiber Optic Sensor For Use In Harsh Environments", issued Apr. 6, 1999 and incorporated herein by reference in its entirety. When using a velocity sensor 103 or speed of sound sensor, the optical sensor 30 may be similar to those described in commonly-owned U.S. Pat. No. 6,354,147, entitled "Fluid Parameter Measurement in Pipes Using Acoustic Pressures", issued Mar. 12, 2002 and incorporated herein by reference in its entirety. When using a seismic sensor or acoustic sensor, the optical sensor 30 may be similar to the Bragg grating sensor described in commonly-owned U.S. Pat. No. 6,072,567, entitled "Vertical Seismic Profiling System Having Vertical Seismic Profiling Optical Signal Processing Equipment and Fiber Bragg Grafting Optical Sensors", issued Jun. 6, 2000, which is herein incorporated by reference in its entirety.

FIG. 2 depicts an alternate embodiment of the present invention. A casing string 105 includes individual mandrels or casing sections 105A, 105B, and 105C, which are preferably threadedly connected to one another. The casing string 105 may include three casing sections 105A–C, as shown, or may include any other number of casing sections threadedly connected to one another. Alternatively, one casing section 105B may constitute an embodiment of the present invention. The casing string 105 has an inner surface 106 and an outer surface 107.

The casing string 105 is disposed within a wellbore 110 located within a formation 115. A physically alterable bonding material 120, preferably cement, may be disposed around the outer surface 107 of the casing string 105 to set the casing string 105 within the wellbore 110. The physically alterable bonding material 120 is set in an annulus between the outer surface 107 and an inner diameter of the wellbore 110.

At a surface 165 of the wellbore 110 is a wellhead 150. Also at the surface 165 is a signal interface 160, to which an optical cable 155 is connected. The signal interface 160, optical cable 155, and wellhead 150 include substantially the same components and perform substantially the same functions as the signal interface 60, optical cable 55, and wellhead 50 of FIG. 1, so the above discussion regarding these components of FIG. 1 applies equally to the components of FIG. 2.

One or more of the casing sections 105A–C include one or more protective pockets 111 around the outer surface 107 of the casing sections 105A, B, and/or C. Alternatively, although not shown, the one or more protective pockets 111 may be located around the inner surface 106 of the casing sections 105A, B, and/or C. FIG. 2 shows a protective pocket 111 disposed around the outer surface 107 of the casing section 105B. The protective pocket 111 is a tubular-shaped mandrel which is preferably built into the casing section 105B, so that the casing section 105B may conveniently be placed within the casing string 105 by threaded connection and thus made readily usable. The protective pocket 111 may be welded at the connection points to the outer surface 107 of the casing section 105B. In an alternate method of attachment to the casing section 105B, the protective pocket 111 may be threaded onto the outer surface 107 of the casing section 105B.

Housed within the protective pocket 111 is at least one optical sensor 130, which is disposed around the outer surface 107 of the casing string 105. The optical sensor 130 performs substantially the same functions, has substantially the same characteristics, and is configured in substantially the same manner as the optical sensor 30 described above in relation to FIG. 1; therefore, the above discussion regarding the optical sensor 30 applies equally to the optical sensor 130. The optical cable 155 connects the optical sensor 130 to the signal interface 160 to communicate information gathered from within the wellbore 110 and/or the formation 115 from the optical sensor 155 to the signal interface 160, as well as to transmit signals from the light source located within the signal interface 160 to the optical sensor 130. To connect the optical sensor 130 to the signal interface 160, the optical cable 155 runs through the protective pocket 111 at a predetermined location.

An alternate embodiment of the present invention is shown in FIG. 3. A casing string 205, which may include one or more casing sections threadedly connected to one another, is disposed within a wellbore 210 located within a formation 215. The casing string 205 may be set within the wellbore 210 using a physically alterable bonding material 220 as described above in relation to FIG. 1. The casing string 205 has an inner surface 206 and an outer surface 207.

A wellhead 250 located at a surface 265 of the wellbore 210, a signal interface 260, and an optical cable 255 are substantially similar in configuration, operation, and function to the wellhead 50, signal interface 60, and optical cable 55 described above in relation to FIG. 1; accordingly, the above discussion applies equally to the wellhead 250, signal interface 260, and optical cable 255 of FIG. 3. However, an optical cable 255 of FIG. 3 runs through a wall of the casing string 205, between the inner surface 206 and the outer surface 207 of the casing string 205, rather than outside the outer surface 207 of the casing string as depicted in FIG. 1.

In the embodiment shown in FIG. 3, an optical sensor 230 is at least partially embedded within the wall of the casing string 205 between the inner surface 206 and the outer surface 207 of the casing string 205. The optical sensor 230 as well as the optical cable 255 may be placed within the wall of the casing string 205 when the casing string 205 is constructed. A casing section may house the optical sensor 230 within its wall, so that the casing section may be readily threadedly connected to other casing sections which may or may not have optical sensors 230 located therein, to form the casing string 205. The optical sensor 230 is substantially the same as the optical sensor 30, so that the above discussion applies equally to the optical sensor 230.

FIG. 4 shows a further alternate embodiment of the present invention similar to FIG. 1, but with a different location of a sensor carrier 325, optical sensor 330, and optical cable 355 in relation to the casing string 305. As illustrated in FIG. 4, the sensor carrier 325 is attached to the inner surface 306 of the casing string 305. The optical sensor 330 is disposed within the sensor carrier 325, and thus disposed around the inner surface 306 of the casing string 305. The optical cable 355 may run from the optical sensor 330, through the wall of the casing string 305, up by the outer surface 307 of the casing string 305, and to the signal interface 360.

As described above, the sensor carrier 325 may be welded to the inner surface 306 of the casing string 305, or in the alternative, clamped firmly onto the inner surface 306. The sensor carrier 325 protects the optical sensor 330 within its housing from conditions within the wellbore 310, as well as attaches the optical sensor 330 to the casing string 305.

Another embodiment of the present invention is illustrated in FIG. 5, including a casing string 405 with an inner surface 406 and an outer surface 407, and an optical sensor 430 attached to the outer surface 407. In this embodiment, there is no sensor carrier 25 as in the embodiment of FIG. 1. The optical sensor 430 is welded or firmly clamped directly to the outer surface 407 of the casing string 405. The casing string 405 with the optical sensor 430 attached to its outer surface 407 may be permanently set within the wellbore 410 with the physically alterable bonding material 420, preferably cement.

Although not depicted, the optical sensor 430 may be directly attached to the inner surface 406 in the same way as described above in relation to its attachment to the outer surface 407. In this embodiment, the optical cable 455 may be routed from the optical sensor 430 through the casing string 405 and alongside the outer surface 407 of the casing string 405 to the signal interface 460.

In the above embodiments, the physically alterable bonding material 420 may be used to couple the optical sensor(s) 430 (when employing seismic sensors) to the formation 415 to allow sensing of formation parameters. In the alternative, the seismic sensors may be coupled to the formation 415 by significant contact with the formation 415. Thus, the above embodiments are advantageous relative to the prior art production string deployed seismic sensors, which involved complicated and tenuous coupling of the sensors to the formation from the production tubing. Also in the above embodiments, any number of optical sensors 30, 130, 230, 330, 430 may be disposed along the casing string 5, 105, 205, 305, 405, in any combination of attachment by one or more sensor carriers 25, 325, attachment by one or more protective pockets 111, embedding within the casing string 205 wall, and/or attachment directly to the casing string 405. Further, any combination of types of optical sensors 30, 130, 230, 330, 430, including but not limited to pressure sensors, temperature sensors, acoustic sensors, and seismic sensors, may be used along the casing string 5, 105, 205, 305, 405 and connected to the signal interface 60, 160, 260, 360, 460 by a common optical cable 55, 155, 255, 355, 455 or by multiple optical cables running from each optical sensor 30, 130, 230, 330, 430. In the embodiments involving the sensor carriers 25, 325 and the protective pocket 111, any number of optical sensors 30, 330, or 130 may be present within the sensor carrier 25, 325 and/or the protective pocket 111.

The operation of any or all of the embodiments of FIGS. 1–5 will be described with the component numbers of FIG. 1, unless otherwise indicated. Initially, one or more casing sections are threaded to one another to form the casing string 305. The casing sections may already have the sensor carrier 25 and/or the sensor carrier 325, the protective pocket 111, the embedded optical sensor 230, and/or the optical sensor 430 attached directly to them, as well as the optical sensor(s) 30, 230 located within the sensor carrier(s) 25, 325 and/or protective pocket(s) 111. Alternatively, the optical sensor(s) 30 may be attached after the casing string 5 has been assembled from the casing sections. The attachment of the sensor(s) 30, protective pocket(s) 111, and/or sensor carrier (s) 25, 325 may be by welding, firmly clamping, threading onto the casing string 5, or by any other method described above or known to those skilled in the art. The one or more optical cable(s) 55 is connected at one end to the one or more optical sensor(s) 30 and at the other end to the signal interface 60.

A drill string (not shown) having an earth removal member (not shown) at its lower end is utilized to drill into the formation 15 to a first depth. Alternatively, the casing string 5 may have an earth removal member operatively connected to its lower end, and the casing string 5 may be used to drill into the formation 15. In both cases, drilling fluid is circulated through the drill string or casing string 5 while drilling to wash particulate matter including cuttings from the formation 15 up to the surface 65. In the case of drilling with the drill string, the drill string is retrieved to the surface 65, and the casing string 5 is lowered into the drilled-out wellbore 10. When drilling with the casing string 5, the casing string 5 is already disposed within the wellbore 10 and remains therein.

After the casing string 5 is located within the wellbore 10, the physically alterable bonding material 20 may be introduced into the inner diameter of the casing string 5, to flow out through the lower end of the casing string 5, then up through an annulus between the outer surface 7 of the casing string 5 and the inner diameter of the wellbore 10. The physically alterable bonding material 20 may be allowed to fill at least a portion of the annulus and to cure under hydrostatic conditions to permanently set the casing string 5 within the wellbore 10. FIGS. 1–5 show the casing strings 5, 105, 205, 305, 405 cemented within the wellbore 10, 110, 210, 310, 410, the optical sensors 30, 130, 230, 330, 430 therefore permanently deployed within the wellbore 10, 110, 210, 310, 410 by use of the casing strings 5, 105, 205, 305, 405.

At this point, the optical sensor 30, when using a seismic sensor, is coupled to the formation 15 and therefore is capable of sensing conditions within the formation 15. If the optical sensor 30 is a pressure or temperature sensor, the light source within the signal interface 60 may introduce a light signal into the optical cable 55. Then the optical sensor 30 may be used to transmit these wellbore parameters to the signal interface 60. The signal interface 60 is then used to process the measured parameters into readable information. In the alternative, processing of wellbore or formation parameters into readable information may be accomplished off-site. After setting the casing string 5 within the formation 15, the optical sensor 30 is capable of measuring wellbore and formation parameters in real time during all subsequent operations, including further drilling and completion operations as well as production and intervention operations.

Seismic Sensing

If the optical sensor 30 is a seismic or acoustic sensor, source of seismic energy (not shown) must be present to emit an acoustic or seismic wave into the formation 15. The seismic source may be active and controlled, may result from microseismic events that can occur naturally, or may be induced by hydrocarbon fluid production-related effects. The acoustic wave is then reflected or partially reflected from the formation 15 into the seismic sensor 30, which detects and measures the acoustic wave emitted by the seismic source. One or more seismic sources may emit one or more acoustic waves that are at least partially reflected at different locations within the formation 15 to measure conditions at multiple locations within the formation 15. Seismic data obtained with the optical seismic sensor 30 can be used to directly estimate rock properties, water saturation, and hydrocarbon content. The operation of an optical seismic sensor used while inserting a drill string into a casing string (as well as while the drill string is stationary) and the measurements obtained with the optical sensor are described in co-pending U.S. patent application Ser. No. 10/677,135, filed on the same day as the current application, entitled "Instrumentation for a Downhole Deployment Valve", which is herein incorporated by reference in its entirety.

The seismic source(s) may be located within the wellbore 10 such as in a drill string used to drill a wellbore of a second depth within the formation 15 (described below), or may be located at the surface 65 of the wellbore 10. Additionally or alternatively, the seismic source(s) may be located within a proximate wellbore (not shown). The vibration of the drill string itself during drilling a wellbore of a second depth (described below) against the casing string 5 or against the wellbore 10, or the vibration of another tool within the wellbore 10, may also constitute the seismic source(s). As described above, each seismic source emits an acoustic wave into various locations with the formation 15, then the acoustic wave at least partially reflects from the locations in the formation 15 back to the seismic sensor 30, which transmits the formation 15 parameter to the signal interface 60 through the optical cable 55. Additionally, each of the seismic sources may transmit an acoustic wave directly to the seismic sensor 30 for calibration purposes to account for the time delay caused by reflection from the formation 15. The direct transmission of the acoustic wave is necessary to process the gathered information and interpret the final image by deriving the distance between the seismic source and the seismic sensor 30 plus the travel time.

In a specific application of the present invention, the seismic source may be located on or within the drill string (not shown) used to drill to a second depth within the formation 15 to set a second casing string (not shown) in the formation 15 below the first casing string 5 or to access the formation 15 below the first casing string 5 (e.g., to recover hydrocarbon fluid from an open-hole wellbore drilled below the first casing string 5). The seismic source may be located on or in the earth removal member at the lower end of the drill string. In the alternative, the seismic source may constitute the vibration of the drill string, earth removal member, and/or any other tool used in drilling into the formation 15 to a second depth.

In the above application, the drill string is lowered into the inner diameter of the casing string 5 through and below the casing string 5. The drill string is then used to drill the wellbore to a second depth within the formation 15. Drilling fluid is circulated while the drill string is lowered to the second depth. Because the seismic sensor 30 is permanently located on, in, or within the casing string 5, formation parameters may be constantly measured and updated in real time while lowering the drill string into the inner diameter of the casing string 5, as well as while drilling with the drill string to the second depth within the formation 15.

If the seismic source is at the surface 65 or within a proximate wellbore, seismic conditions may be measured prior to as well as after insertion of the drill string into the wellbore 10, so that real time formation conditions may be transmitted to the surface 65 through acoustic waves emitted from the seismic source and at least partially reflected from the formation 15 at one or more locations to the seismic sensor 30, then through formation parameters transmitted through the optical cable 55. Regardless of the location of the seismic source(s), the optical cable 55 is used to send the wellbore parameter measurements to the signal interface 60. The signal interface 60 processes the information received through the optical cable 55. The operator may read the information outputted by the processing unit and adjust the position of the drill string during drilling, the composition of the drilling fluid used during drilling with the drill string, or any other parameter during the life of the well. In the alternative, the data may be interpreted off-site at a data processing center.

Any number of acoustic waves may be emitted by any number of seismic sources at any angle with respect to the formation 15 and to any location within the formation 15. Seismic measurements may be used in the above embodiments to monitor the drilling-induced vibrations of the drill string to possibly evaluate drilling conditions within the formation 15, such as wear of the earth removal member or drill bit, type of rock that makes up the formation 15, and/or smoothness of drilling.

Measuring Flow While Drilling

FIG. 6 shows another embodiment of the present invention. A flow meter 575 is threadedly connected to casing sections above and/or below the flow meter 575 to form a casing string 505. The casing string 505, which has an inner surface 506 and an outer surface 507, is shown set within a wellbore 510. The wellbore 510 has been drilled out of a formation 515. The casing string 505 may be set within the wellbore 510 by introducing a physically alterable bonding material 520, preferably cement, into an annulus between the outer surface 507 of the casing string 505 and the inner diameter of the wellbore 510, and allowing the physically alterable bonding material 520 to cure under hydrostatic conditions to permanently set the casing string 505 within the wellbore 510.

A wellhead 550 may be located at a surface 565 of the wellbore 510. Various tools, including the casing string 505 and a drill string 580 (described below) may be lowered through the wellhead 550. A signal interface 560 is also present at the surface 565. The signal interface 560 may include a light source, delivery equipment, and logic circuitry, including optical signal processing, as described above in relation to the signal interface 60 of FIG. 1. An optical cable 555, which is substantially the same as the optical cable 55 described above in relation to FIG. 1, is connected at one end to the signal interface 560.

The flow meter 875 may be substantially the same as the flow meter described in co-pending U.S. patent application Ser. No. 10/348,040, entitled "Non-Intrusive Multiphase Flow Meter" and filed on Jan. 21, 2003, which is herein incorporated by reference in its entirety. Other flow meters may also be useful with the present invention. The flow meter 575 allows volumetric fractions of individual phases of a multiphase mixture flowing through the casing string 505, as well as flow rates of individual phases of the multiphase mixture, to be found. The volumetric fractions are determined by using a mixture density and speed of sound of the mixture. The mixture density may be determined by direct measurement from a densitometer or based on a measured pressure difference between two vertically displaced measurement points and a measured bulk velocity of the mixture, as described in the above-incorporated by reference patent application. Various equations are utilized to calculate flow rate and/or component fractions of the fluid flowing through the casing string 505 using the above parameters, as disclosed and described in the above-incorporated by reference application.

In one embodiment, the flow meter 575 may include a velocity sensor 591 and speed of sound sensor 592 for measuring bulk velocity and speed of sound of the fluid, respectively, up through the inner surface 506 of the casing string 505, which parameters are used in equations to calculate flow rate and/or phase fractions of the fluid. As illustrated, the sensors 591 and 592 may be integrated in single flow sensor assembly (FSA) 593. In the alternative, sensors 591 and 592 may be separate sensors. The velocity sensor 591 and speed of sound sensor 592 of FSA 593 may be similar to those described in commonly-owned U.S. Pat. No. 6,354,147, entitled "Fluid Parameter Measurement in Pipes Using Acoustic Pressures", issued Mar. 12, 2002 and incorporated herein by reference.

The flow meter 575 may also include combination pressure and temperature (P/T) sensors 514 and 516 around the outer surface 507 of the casing string 505, the sensors 514 and 516 similar to those described in detail in commonly-owned U.S. Pat. No. 5,892,860, entitled "Multi-Parameter Fiber Optic Sensor For Use In Harsh Environments", issued Apr. 6, 1999 and incorporated herein by reference. In the alternative, the pressure and temperature sensors may be separate from one another. Further, for some embodiments, the flow meter 575 may utilize an optical differential pressure sensor (not shown). The sensors 591, 592, 514, and/or 516 may be attached to the casing string 505 using the methods and apparatus described above in relation to attaching the sensors 30, 130, 230, 330, 430 to the casing strings 5, 105, 205, 305, 405 of FIGS. 1–5.

Embodiments of the flow meter 575 may include various arrangements of pressure sensors, temperature sensors, velocity sensors, and speed of sound sensors. Accordingly, the flow meter 575 may include any suitable arrangement of sensors to measure differential pressure, temperature, bulk velocity of the mixture, and speed of sound in the mixture. The methods and apparatus described herein may be applied to measure individual component fractions and flow rates of a wide variety of fluid mixtures in a wide variety of applications. Multiple flow meters 575 may be employed along the casing string 505 to measure the flow rate and/or phase fractions at various locations along the casing string 505.

The flow meter 575 may be configured to generate one or more signals indicative of mixture density and speed of sound in the mixture. For some embodiments, a conventional densitometer (e.g., a nuclear fluid densitometer) may be used to measure mixture density as illustrated in FIG. 3 of the above-incorporated application (Ser. No. 10/348,040) and described therein. However, for other embodiments, mixture density may be determined based on a measured differential pressure between two vertically displaced measurement points and a bulk velocity of the fluid mixture, also described in the above-incorporated application (Ser. No. 10/348,040). The signal interface 560 is configured to determine flow rate and/or volumetric phase fractions based on the signals generated by the flow meter 575, for example by using the equations described in the above-incorporated application (Ser. No. 10/348,040).

Also depicted in FIG. 6 is a drill string 580. The drill string 580 includes a tubular 582 having an earth removal member 581 attached to its lower end. The earth removal member 581 has passages 583 and 584 therethrough for use in circulating drilling fluid F1 while drilling into the formation 515 (see below).

In use, the flow meter 575 is placed within the casing string 505, e.g., using the previously described technique of threaded connection to other casing sections. The casing string 505 may also include casing sections including one or more of the sensor arrangements described above and shown in FIGS. 1–5 to simultaneously measure wellbore or formation parameters such as pressure, temperature, seismics, and/or acoustics, while also measuring flow rate and/or component fractions with one or more flow meters 575.

The wellbore 510 is drilled to a first depth with a drill string (not shown). The drill string is then removed. The casing string 505 is then lowered into the drilled-out wellbore 510, and physically alterable bonding material 520 may be introduced in the annulus and allowed to cure at hydrostatic conditions to set the casing string 505 permanently within the wellbore 510, as described above in relation to FIG. 1.

The flow meter 575 is now permanently installed within the wellbore 510 with the casing string 505 and is capable of measuring formation or wellbore parameters which allow calculation by the signal interface 560 of fluid flow and component fractions present in the fluid flowing through the inner diameter of the casing string 505 during wellbore operations. If employing additional sensors in, on, or within the casing string 505 according to the embodiments of FIGS. 1–5, other formation and wellbore parameters may be simultaneously measured via pressure, temperature, seismic, or acoustic optical sensors, as described above.

Often, the wellbore 510 is drilled to a second depth within the formation 515. As shown in FIG. 6, the drill string 580 is inserted into the casing string 505 and used to drill into the formation 515 to a second depth. During the drilling process, it is customary to introduce drilling fluid F1 into the drill string 580. The drilling fluid F1 flows down through the drill string 580, as indicated by the arrows labeled F1, then out through the passages 583 and 584. After exiting the passages 583 and 584, the drilling fluid F1 mingles with the particulate matter including cuttings produced from drilling into the earth formation 515, then carries the particulate matter including cuttings to the surface 565 by the fluid mixture F2, which includes the drilling fluid F1 and the particulate matter. The fluid mixture F2 flows to the surface 565 through an annulus between the outer diameter of the drill string 580 and the inner surface 506 of the casing string 505, as indicated by the arrows labeled F2. The drilling fluid F1 is ordinarily introduced in order to clear the wellbore 510 of the cuttings and to ease the path of the drill string 580 through the formation 515 during the drilling process.

While the fluid mixture F2 is circulating up through the annulus between the drill string 580 and the casing string 505, the flow meter 575 may be used to measure the flow rate of the fluid mixture F2 in real time. Furthermore, the flow meter 575 may be utilized to measure in real time the component fractions of oil, water, mud, gas, and/or particulate matter including cuttings, flowing up through the annulus in the fluid mixture F2. Specifically, the optical sensors 591, 592, 514, and 516 send the measured wellbore parameters up through the optical cable 555 to the signal interface 560. The optical signal processing portion of the signal interface 560 calculates the flow rate and component fractions of the fluid mixture F2, as described in the above-incorporated application (Ser. No. 10/348,040) utilizing the equations and algorithms disclosed in the above-incorporated application. This process is repeated for additional drill strings and casing strings.

By utilizing the flow meter 575 to obtain real-time measurements while drilling, the composition of the drilling fluid F1 may be altered to optimize drilling conditions, and the flow rate of the drilling fluid F1 may be adjusted to provide the desired composition and/or flow rate of the fluid mixture F2. Additionally, the real-time measurements while drilling may prove helpful in indicating the amount of cuttings making it to the surface 565 of the wellbore 510, specifically by measuring the amount of cuttings present in the fluid mixture F2 while it is flowing up through the annulus using the flow meter 575, then measuring the amount of cuttings present in the fluid exiting to the surface 565. The composition and/or flow rate of the drilling fluid F1 may then be adjusted during the drilling process to ensure, for example, that the cuttings do not accumulate within the wellbore 510 and hinder the path of the drill string 580 through the formation 515.

While the sensors 591, 592, 514, 516 are preferably disposed around the outer surface 507 of the casing string 505, it is within the scope of the invention for one or more of the sensors 591, 592, 514, 516 to be located around the inner surface of the casing string 505 or embedded within the casing string 505, as described above in relation to FIGS. 1–5.

Measuring Flow While Drilling with Casing

FIG. 7 shows an alternate embodiment of the present invention. Most components are substantially the same in FIG. 7 (indicated by the "600" series) as the components in the "500" series of FIG. 6. This embodiment differs from the embodiment of FIG. 6 because the casing string 605 has an earth removal member 621 operatively connected thereto. The earth removal member 621 is used to remove portions of the formation 615 to form a wellbore 610. The casing string 605 is thus placed within the wellbore 610 while drilling into the formation 615.

To allow drilling fluid F1 circulation while drilling, the earth removal member 621 includes passages 623 and 624 therethrough. The drilling fluid F1 is introduced into the casing string 605 while drilling through the formation 615, then exits through the passages 623 and 624. Cuttings and other particulate matter then are swept into the drilling fluid F1 to form the fluid mixture F2 which flows to the surface 665 via an annulus between the casing string 605 and the inner diameter of the wellbore 610. The flow meter 675 measures the flow rate and component fractions of the fluid mixture F2, as described above, and sends the information to the signal interface 660 via the optical cable 655 for processing.

Once the casing string 605 is installed into place within the wellbore 610, the sensors 691, 692, 614, 616 may be utilized to measure the flow rate and/or component fractions of the fluid mixture flowing up through an annulus between the subsequent drill string (not shown) or the subsequent casing string with the earth removal member attached thereto (not shown). Prior to drilling with the subsequent casing string or drill string, the earth removal member 621 may be retrieved from the wellbore 610 after its removal from the casing string 605. In the alternative, the subsequent casing string or drill string may drill through the earth removal member 621 prior to drilling to a second depth within the formation 615. In addition to the flow meter 675, the casing string 605 may include any of the embodiments described in FIGS. 1–5 to employ other types of sensors for other types of measurements, such as seismic, acoustic, temperature, and/or pressure. These wellbore and formation parameters may be continuously measured after lowering the casing string 605 into position within the wellbore 610, including during the drilling process with the subsequent drill string(s) or subsequent casing string(s). In this manner, the flow meter 675 and/or other sensor arrangements of FIGS. 1–5 may be permanently employed within the wellbore 610 to obtain real time measurements during all wellbore operations, including the drilling and completion operations described at length above.

Several applications of the present invention are envisioned. Temperature, pressure, seismic, acoustic, and flow measurements may all be utilized to adjust parameters while drilling with a drill string or drilling with casing when the appropriate sensor(s) is placed on, in, or within the casing string 5, 105, 205, 305, 405, 505, or 605. Temperature, pressure, and flow measurements obtained in the present invention may aid in determining whether an underbalanced states has been reached within the wellbore, permitting adjustment of wellbore conditions to prevent blowout.

Additional applications of the present invention are contemplated that are specific to using one or more seismic sensors as the one or more optical sensors 30, 130, 230, 330, or 430 described in reference to FIGS. 1–5 and installing the seismic sensors with the casing string 5, 105, 205, 305, 405 within the wellbore 10, 110, 210, 310, 410. Before the wellbore is drilled into the formation into which the casing string is set, seismic data is often gathered from the surface to determine formation parameters prior to drilling the well. The seismic measurements from the surface may be calibrated by the seismic measurements obtained by the seismic sensor(s) installed with the casing string.

Additionally, real time seismic measurements may be taken while drilling into the formation during the completion operation. Specifically, imaging ahead of the earth removal member of the subsequent casing string or drill string may aid in determining the direction in which the earth removal member should be steered (geosteering). Various parameters may be adjusted by taking into account the real time seismic measurements obtained while drilling to troubleshoot as well as obtain maximum production from the well. Pore pressure prediction is also possible using the real time seismic measurements during drilling.

Acoustic monitoring while drilling into the formation is also an advantageous application of the present invention. The vibration of the drill string, including the attached earth removal member, as well as other tools within the casing string may be monitored and adjusted. Acoustics relating to drilling fluids may be monitored with the present invention. The present invention allows monitoring of acoustic signals from the wellbore having the casing string permanently disposed therein, or monitoring of acoustic signals from an adjacent wellbore.

In addition to improving seismic and acoustic monitoring of wellbore conditions during drilling, seismic and acoustic monitoring is possible during subsequent wellbore operations with the permanently deployed seismic and acoustic sensors with the casing string. During production, the same sensors which were employed to measure parameters during the completion operation may be utilized, as they are permanently installed within the wellbore. Therefore, microseismic monitoring as well as other acoustic monitoring of production activities is possible with the present invention.

Another contemplated use for the present invention is use of the permanently deployed seismic and/or acoustic sensor(s) for vertical or crosswell seismic profiling. The profiling may be 2D, 3D, or 4D, or continuous microseismic monitoring such as microseismic profiling, depending upon the dimensions into which the seismic source emits the acoustic wave(s), as described above, with the fourth dimension being time. Crosswell seismic may be accomplished when the seismic source is located in an adjacent wellbore by moving the seismic source to accumulate a full image of the formation. Microsesimic monitoring allows the operator to detect, evaluate, and locate small fracture events related to production operations, such as those caused by the movement of hydrocarbon fluids or by the subsidence or compaction of the formation. These measurements are useful while drilling as well as after drilling, and during completion, production, intervention, and any other operations.

Although the above description of FIGS. 1–7 discusses cementing the casing string having the optical sensor attached thereto, it is not necessary in the present invention to cement the casing string within the wellbore. Pressure and temperature sensing with pressure and temperature optical sensors does not require coupling to the formation or cement. Seismic optical sensors do require coupling to the formation to measure formation parameters, but this may be accomplished either by cementing the casing string to the formation or by placing the seismic sensor into significant contact with the wellbore, for example resulting from well deviation or corkscrewing. When cementing the casing string within the formation in the above embodiments, the cement within the annulus may extend up to a portion of the casing string or to the upper end of the casing string or to the surface of the wellbore.

While the foregoing is directed to embodiments of the present invention, other and further embodiments of the invention may be devised without departing from the basic scope thereof, and the scope thereof is determined by the claims that follow.

The invention claimed is:

1. An apparatus for permanently measuring wellbore or formation parameters, comprising:
a casing string permanently located within a wellbore by an alterable bonding material within an annulus between the casing string and a surrounding formation, wherein at least a portion of the casing string comprises a protective pocket attached to an inner surface of the casing string;
at least one sensor attached to the casing string, the at least one sensor capable of measuring one or more wellbore or formation parameters, wherein the at least one sensor is attached to the casing string by location within the protective pocket.

2. The apparatus of claim 1, wherein the protective pocket is disposed around an inner surface of the casing string.

3. The apparatus of claim 1, wherein the one or more wellbore or formation parameters comprises pressure, temperature, seismic conditions, acoustics, fluid composition within a formation, or combinations thereof.

4. The apparatus of claim 1, wherein the physically alterable bonding material is cement.

5. The apparatus of claim 1, wherein the at least one sensor comprises an optical sensor.

6. The apparatus of claim 1, wherein the at least one sensor includes a seismic sensor.

7. The apparatus of claim 1, wherein the at least one sensor includes a circumferential sensor disposed around the inner surface of the casing.

8. The apparatus of claim 1, wherein a plurality of optical sensors are attached to the casing string.

9. The apparatus of claim 8, wherein the plurality of optical sensors attached to the casing string comprise a flow meter.

10. The apparatus of claim 8, wherein the one or more wellbore parameters are used to calculate flow rate of drilling fluid flowing through the casing string, one or more component fractions of components present in the drilling fluid, or combinations thereof.

11. An apparatus for permanently measuring wellbore or formation parameters, comprising:
a casing string permanently located within a wellbore, wherein at least a portion of the casing string comprises a protective pocket attached thereto; and
at least one optical sensor attached to the casing string, the at least one optical sensor capable of measuring one or more wellbore or formation parameters, wherein the at least one optical sensor is attached to the casing string by location within the protective pocket, and wherein the protective pocket is disposed around the casing string by a threaded connection.

12. An apparatus for permanently measuring wellbore or formation parameters, comprising:
a casing string permanently located within a wellbore;
at least one optical sensor located at least partially within a wall of the casing string, the at least one optical sensor capable of measuring one or more wellbore or formation parameters; and
an optical cable located within the wall of the casing string, the optical cable connecting the at least one optical sensor to a signal interface.

13. The apparatus of claim 12, wherein the at least one optical sensor is located completely within the wall of the casing string.

14. The apparatus of claim 12, wherein the one or more wellbore or formation parameters comprises pressure, temperature, seismic conditions, acoustics, flow rate of drilling fluid, component fractions of components present in the drilling fluid, fluid composition within a formation, or combinations thereof.

15. The apparatus of claim 12, wherein a plurality of optical sensors are located at least partially within the wall of the casing string.

16. The apparatus of claim 15, wherein the plurality of optical sensors located at least partially within the wall of the casing string comprise a flow meter capable of measuring flow rate or component fractions of fluid flowing within the casing string.

17. A method of permanently monitoring wellbore or formation parameters, comprising:
providing a casing string having a protective pocket attached to an inner surface of the casing string;
locating the casing string within a wellbore;
setting the casing string permanently within the wellbore with a physically alterable bonding material; and
monitoring a wellbore or formation parameter with a sensor attached to the casing string by location of the sensor within the protective pocket.

18. The method of claim 17, wherein the physically alterable bonding material is cement.

19. The method of claim 17, wherein the sensor includes a seismic sensor.

20. An apparatus for permanently measuring wellbore or formation parameters, comprising:
a casing string permanently located within a wellbore, wherein the casing string defines a substantially uniform inner diameter and a substantially uniform outer diameter across its length;
an alterable bonding material within an annulus between the casing string and a surrounding formation; and
a sensor located at least partially within a wall of the casing string between the inner and outer diameters, wherein the sensor is capable of measuring wellbore or formation parameters.

21. The apparatus of claim 20, wherein the physically alterable bonding material is cement.

22. The apparatus of claim 20, wherein the sensor is attached to an outside of the casing string.

23. The apparatus of claim 20, wherein the sensor is attached to an inside of the casing string.

24. The apparatus of claim 20, wherein the casing string comprises a protective cover that the sensor is located within.

* * * * *